Dec. 19, 1939.  A. P. AULICINO  2,183,954
NONSKIDDING BRAKE
Filed Dec. 9, 1938
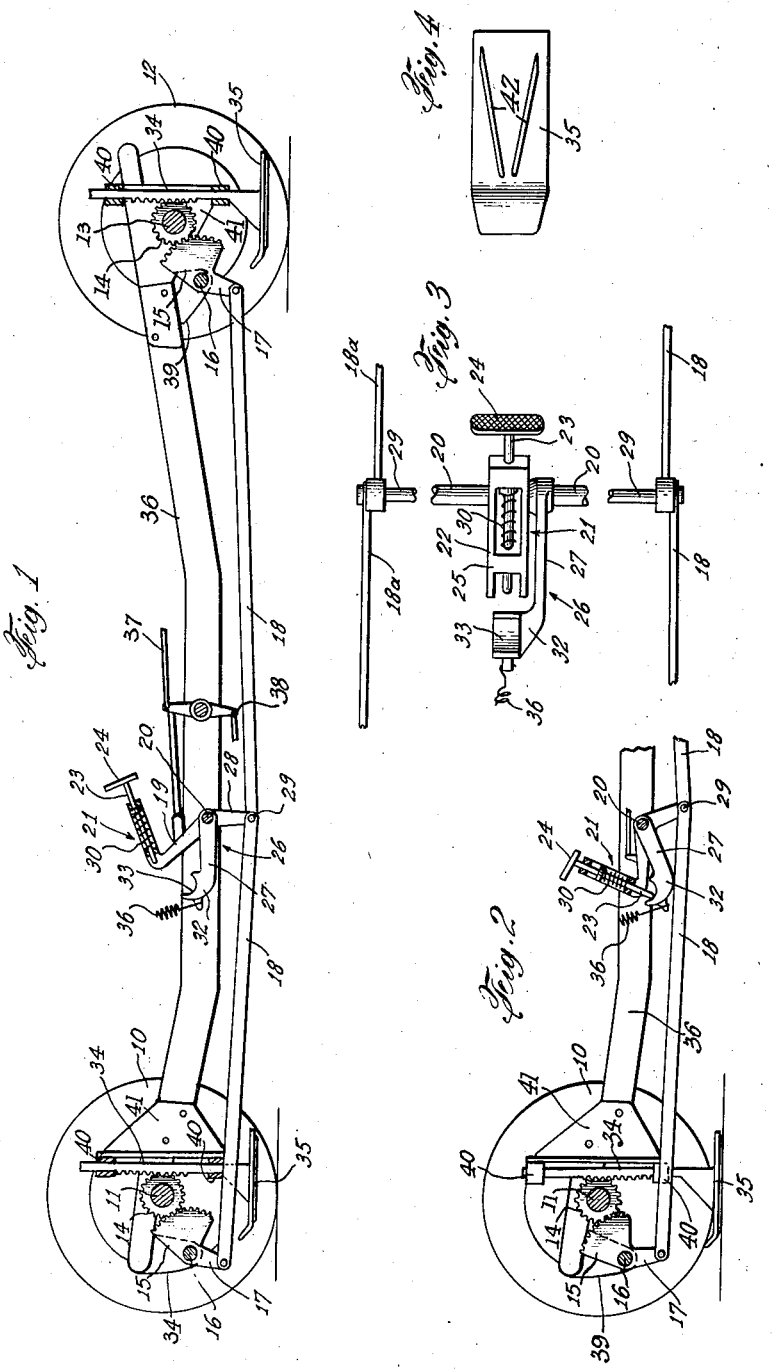
INVENTOR.
A. P. AULICINO
BY
ATTORNEY.

Patented Dec. 19, 1939

2,183,954

UNITED STATES PATENT OFFICE 2,183,954

NONSKIDDING BRAKE

Anthony P. Aulicino, Brooklyn, N. Y.

Application December 9, 1938, Serial No. 244,720

2 Claims. (Cl. 188—5)

This invention relates to braking means for automotive vehicles, and aims to provide such means whereby an automobile which is about to skid because the applied brakes fail to stop it, as on a slippery road, will be positively applied upon continued pressure on the brake pedal.

The above and other objects will become apparent in the description below, in which characters of reference refer to like-named parts in the accompanying drawing.

Referring briefly to the drawing, Figure 1 is a fragmentary side view, partly in section, of an automobile equipped with the present invention.

Figure 2 is a partial duplication of Figure 1, showing the non-skid means in extended position.

Figure 3 is a plan view of the central portion of Figure 1.

Figure 4 is a view showing the underside of one of the non-skid shoes.

Referring in detail to the drawing, the numeral 10 represents a front wheel mounted on its axle 11, and the numeral 12 a rear wheel mounted on its axle 13. Each axle 11 and 13 has a pinion 14 loosely mounted thereon, in mesh with a sector gear 15. The latter are pivoted on pins 16 rigid on a projection 39 of the chassis 36. Ears 17 extend downward on the sectors 15 beyond the pins 16. Rods 18 have their outer ends pivoted to the extremities of the ears 17 and extend inward the chassis.

The brake lever of the vehicle is indicated at 19, rigid with the shaft 20, and to accommodate it to the purposes of this invention, is of special construction. The upper arm 21 of the lever 19 comprises a U-shaped frame 22 having an opening through its top (the base of the U) through which a shank 23 passes slidably, the shank having an enlarged head or pedal 24 thereon on which the foot of the operator is adapted to be set to operate the device. A rigid block 25 near the other end of the frame 22 also has a similar opening, through which the shank 23 projects. The standard brake rods 37 and 38 are secured in the usual manner to the lever 19.

A bell crank 26, having the arms 27 and 28, is pivoted on the shaft 20, and both rods 18 are pivoted on the end of a shaft 29 to the arm 28. A stout coiled spring 30 surrounds the shank 23 between the block 25 and a collar 31 rigid on the shank, and normally urges the pedal 24 outward.

The arm 27 of the bell crank 26 has its end 32 enlarged and turned upward, and has a concave cup 33 formed therein. At each wheel of the vehicle a vertical rack, or jack, 34 is slidably mounted in vertically aligned guide sleeves 40 forming the arms of yokes 41 secured on the chassis, and is in mesh with the adjacent pinion 14. Each rack 34 has at its lower end a shoe 35 whose lower surface may be provided with divergent ribs 42 as shown in Figure 4. Normally, the shoes 35 are in the position shown in Figure 1, with the shoes 35 raised above the road surface.

The operation of the device is as follows; When it is desired to stop the vehicle, the brake pedal 24 is depressed in the usual manner. With brake operating means of modern design brakes are depressed with but little mechanical effort, especially in the case of hydraulic brakes. The spring 30 is of sufficient resistance to carry with it the frame 21 between the extreme positions of the brakes being unapplied and fully applied. Thus, in applying the brakes down to the fully applied position, the shank 23 will not move with respect to the frame 21. If the vehicle, however, instead of coming to a stop after the brakes have thus been fully applied, continues to skid with its wheels locked, the pedal 24 is pressed upon with much greater force, i. e., sufficient force to overcome the resistance of the spring 30 and the spring 36. Then the pedal 24 will move toward the frame 21, and the other end of the shank 23 will move outward from the frame into the cup 33. There it will strike the arm 27 and turn it counter clockwise about its pivot 20, into the position shown in Figure 2. Thus, the rod 18 at the left of the pivot 29 will be pulled to the right and the rod 18 at the right of the pivot 29 will be pushed to the right. Both rods will then turn their sectors 15 and force the shoes 35 downward against the road and lift the wheels off the ground. In view of the skidding of the car, this will be easily accomplished, as considerably less force is required to lift a skidding vehicle than one which is at rest.

The mechanism shown in the drawing at only two of the wheels of the vehicle is of course applied to all four wheels, the mechanism on wheels on the other side being operated simultaneously by the rods 18a. The spring 36, which is relatively heavy, is shown as a means for restoring the bell crank 26 and the other parts of the mechanism operating the shoes 35, to its normal inactive position upon release of the pedal 24. The spring 30 is lighter than the spring 36.

The shoes 35 may be of any desired material and conformation, preferably of metal provided with a so-called non-skid, or skid-reducing, surface at the bottom, and when the vehicle is lifted on them, it is apparent that it will quickly come to a stop.

Obviously, modifications in form and structure may be made without departing from the spirit and scope of the invention.

I claim:

1. In a vehicle having wheel brakes and a pedal operated brake lever, jacks slidably vertically mounted adjacent the wheels of the vehicle, said jacks having shoes mounted on their lower ends normally in elevated position above the road, means for extending said jacks downward to the road level and lifting said wheels off the road by said jacks, said brake lever having a shank slidably mounted therein and a pedal on the upper end of said shank, the lower end of said shank extending through said brake lever, resilient means normally urging said pedal outward from said brake lever, a bell crank pivotally mounted on the vehicle and having the end of one arm thereof lying in the orbit of said brake lever at an arcuate distance therefrom, said brakes being locked on the wheels by moving said brake lever through an arc into a position in which said lever touches said end of said bell crank arm, said resilient means maintaining said pedal in its normal outward position on said lever during said arcuate movement of said lever, continued and increased pressure on said pedal causing said lower end of said shank to contact said crank arm end to move the latter though an arc, means connecting said crank arm with said jack extending means, said connecting means being actuated by said arcuate movement of said crank arm to extend said jacks, and means for restoring said jacks and said crank arm to normal inactive position.

2. In a vehicle having wheel brakes and a pedal operated brake lever, jacks slidably vertically mounted adjacent the wheels of the vehicle, said jacks having shoes mounted on their lower ends normally in elevated position above the road, means for extending said jacks downward to the road wheel and lifting said wheels off the road by said jacks, said brake lever having a shank slidably mounted therein and a pedal on the upper end of said shank, the lower end of said shank extending through said brake lever, resilient means normally urging said pedal outward from said brake lever, a bell crank pivotally mounted on the vehicle and having the end of one arm thereof lying in the orbit of said brake lever at an arcuate distance therefrom, said brakes being locked on the wheels by moving said brake lever through an arc into a position in which said lever touches said end of said bell crank arm, said resilient means maintaining said pedal in its normal outward position on said lever during said arcuate movement of said lever, continued and increased pressure on said pedal causing said lower end of said shank to contact said crank arm end and to move the latter through an arc, means connecting said crank arm with said jack extending means, said connecting means being actuated by said arcuate movement of said crank arm to extend said jacks, and means for restoring said jacks and said crank arm to normal inactive position, said crank arm end being cupped, said lower end of said shank engaging said cup during its said contact with said crank arm end.

ANTHONY P. AULICINO.